United States Patent
Payne

[15] 3,642,020
[45] Feb. 15, 1972

[54] PRESSURE OPERATED—POSITIVE DISPLACEMENT SHUTTLE VALVE
[72] Inventor: Vivian H. Payne, Houston, Tex.
[73] Assignee: Cameron Iron Works, Inc., Houston, Tex.
[22] Filed: Nov. 17, 1969
[21] Appl. No.: 877,120

[52] U.S. Cl................................137/112, 251/175, 251/186, 251/190, 251/282
[51] Int. Cl......................................F16k 31/12
[58] Field of Search.............137/112, 113, 625.68; 251/175, 251/185, 186, 190, 282

[56] References Cited
UNITED STATES PATENTS

| | | | |
|---|---|---|---|
| 2,821,972 | 2/1958 | Banker | 137/112 X |
| 3,215,163 | 11/1965 | Henderson | 251/186 X |
| 3,258,022 | 6/1966 | Thompson | 137/112 X |
| 3,370,611 | 2/1968 | Flint | 251/175 X |

*Primary Examiner*—Robert G. Nilson

[57] ABSTRACT

A shuttle valve which requires positive pressure to provide positive displacement thereof.

5 Claims, 4 Drawing Figures

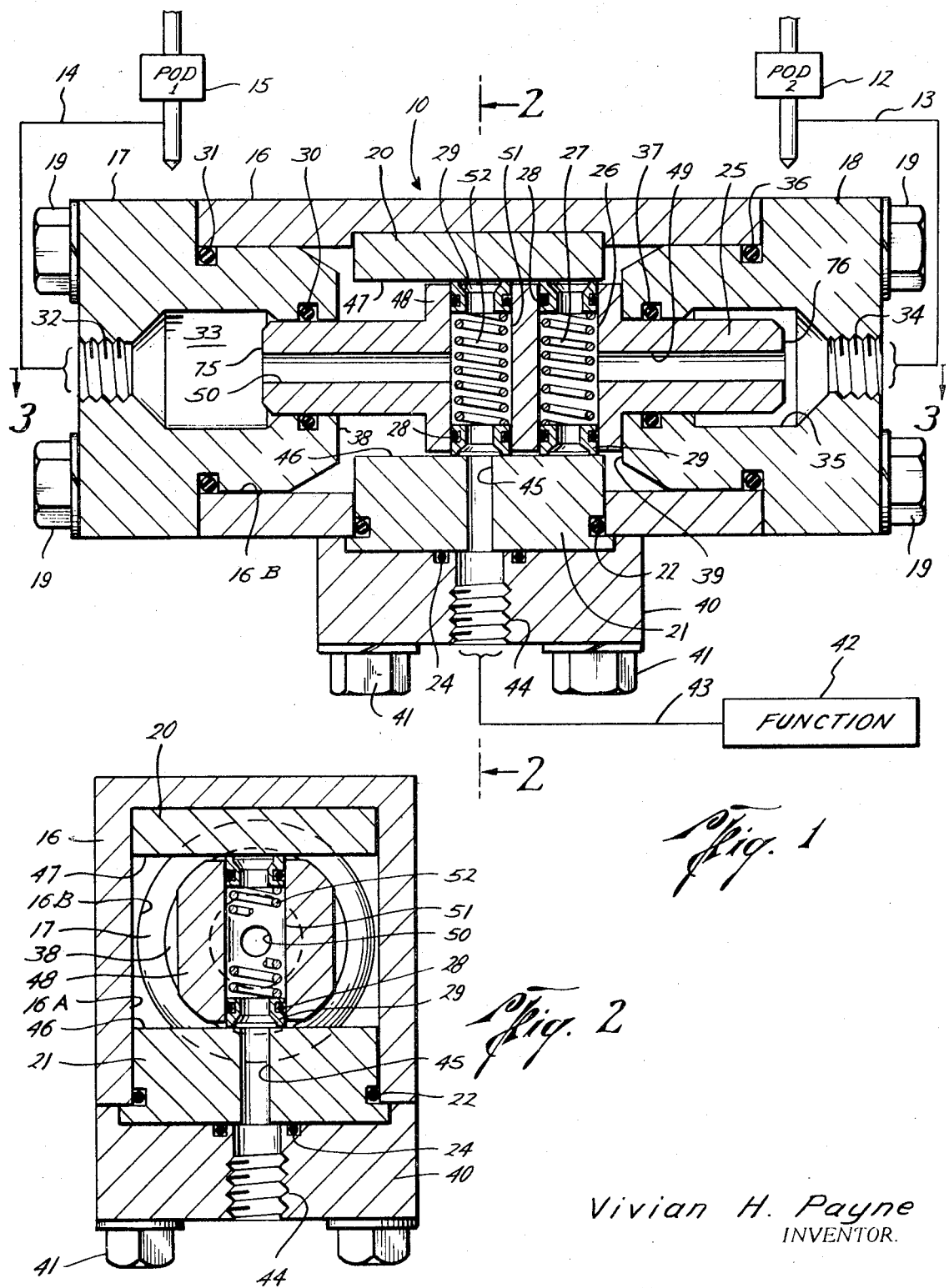

Vivian H. Payne
INVENTOR.

BY G. Donald Weber Jr.
ATTORNEY

PRESSURE OPERATED—POSITIVE DISPLACEMENT SHUTTLE VALVE

BACKGROUND

Shuttle valves are known in the art. Usually, however, shuttle valves are of the velocity type. That is, the piston of the shuttle valve is caused to switch from one position to another position as a direct result of a relatively large pressure supplied to the piston which pressure is produced by a significant fluid flow (in the case of a hydraulic valve).

Shuttle valves of the velocity type have a distinct disadvantage in the application wherein a relatively small fluid flow is provided. Such a small fluid flow frequently is insufficient to apply enough pressure to the piston to move said piston from one position to another position. In this situation, it frequently happens that the piston is shifted to an intermediate point in the valve. Since the piston has certain amount of clearance therearound, and since the fluid flow is relatively small, the fluid leaks around the piston and the valve does not assume either of the discrete positions. In this case, the effect of a shuttle valve is totally lost and the valve becomes essentially useless and, perhaps, dangerous.

SUMMARY OF THE INVENTION

To avoid the problems associated with a velocity-type shuttle valve, the instant pressure operated positive displacement type shuttle valve is provided. In this valve, the piston includes ports which interconnect the inlet and outlet ports on the valve. Consequently, little or no leakage around the piston is permitted. Moreover, the piston is not moved until the pressure applied by the input unit is appropriately applied thereto. Since the piston includes the aforesaid interconnection ports, the piston must be totally displaced in response to a pressure at the inlet port inasmuch as the pressure applied thereto cannot be relieved until the piston port is aligned with the outlet port of the valve.

Consequently, one object of this invention is to provide a new shuttle valve.

Another object of this invention is to provide a shuttle valve which is pressure operated.

Another object of this invention is to provide a pressure-operated shuttle valve which requires positive displacement of the shuttle piston to be effective.

Another object of this invention is to provide a shuttle valve which is hydraulically balanced.

Another object of this invention is to provide a pressure-operated positive displacement shuttle valve which is utilized in an underwater control system.

DESCRIPTION OF THE DRAWINGS

FIG. 1 is a cross-sectional view of the instant shuttle valve shown in a schematic system configuration.

FIG. 2 is a cross-sectional view of the shuttle valve taken along the lines 2—2 in FIG. 1.

DESCRIPTION OF THE PREFERRED EMBODIMENT

Figure 3:
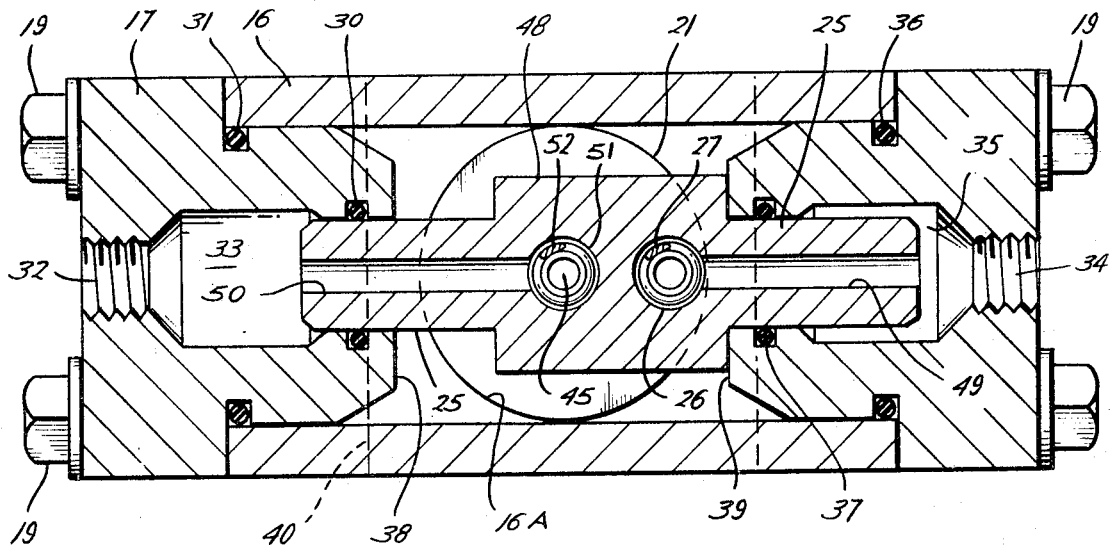
FIG. 3 is a cross-sectional view of the instant valve taken along the lines 3—3 in FIG. 1.

This description refers to the drawings noted supra in which drawings similar components bear similar reference numerals.

Referring now to FIG. 1, there is shown a cross-sectional side view of shuttle valve 10. The valve is schematically represented as connected between two subsurface control pods and a utilization function. Control pod 12 is connected via line 13 to one input of valve 10 while pod 15 is connected via line 14 to another input of valve 10. Pods 12 and 15 are typical pods which are manufactured by Offshore Systems Inc., Houston, Texas. These pods are connected to subsurface devices such as oil wells or the like. In particular, the pods may be connected to blowout preventer stacks to effect control thereof. More particularly, in the system described, pods 12 and 15 are identical and provide redundant control. This redundancy permits the subsea apparatus to be selectively controlled by pod 12 or 15 so that a malfunction in one pod will not cause the production operation to be shut down. That is, if a malfunction occurs in one pod, it may be disconnected from the subsea unit, taken to the surface and repaired while the second pod is connected to in control of the subsea unit.

Referring now to FIGS. 1, 2 and 3, it is seen that valve 10 includes a plurality of parts. Body 16 is the centrally located member which has a square or rectangular configuration and an axial bore of circular cross section therethrough. This bore is designated by the surface 16B. In addition, a second bore having a circular configuration and which intersects the first bore is provided in body 16. The second bore passes through the bottom surface of body 16 through the first bore and into the outer wall of the top of the center body 16. The second bore is represented by surface 16A in FIGS. 2 and 3. Bores 16A and 16B may be molded into body 16 or produced by a suitable drill or boring technique. The second bore represented by lined surface 16A does not pass completely through the upper surface of body 16. This partial bore provides a seating location for balance plate 20. Balance plate 20 is, in this embodiment, circular in cross section and has the surface 47 thereof lapped and polished. This surface is relatively critical as a sealing surface. Consequently, a fine finish is applied thereto.

The aperture or hole which is produced in the lower surface of body 16 by passing the second bore therethrough is provided to receive seal plate 21. Seal plate 21 includes a lapped and polished surface 46 which, is also a relatively critical sealing surface and has the same finish as surface 47 of balance plate 20. In addition, seal plate 21 includes shoulders which extend over the outer surface of body 16 to retain seal plate 21 in the position shown. An annular groove is provided on the outer surface of seal plate 21 and O-ring 22 is inserted therein. In the preferred embodiment, the annular groove and O-ring are located immediately adjacent the shoulder portion of seal plate 21. Obviously, seal plate 21 has a substantially circular cross sectional configuration to meet with the circular configuration of the aperture produced by the boring operation. An axial bore 45 is provided in seal plate 21.

Outlet flange 40 has a substantially rectangular configuration and is joined to body 16 by means of bolts 41. Suitable lock washers or the like may be utilized. Outlet flange 40 has a recessed portion which recess has the configuration appropriate to receive the outer surface of seal plate 21. Thus, the recess in outlet flange 40 is substantially circular in cross section and as deep as the thickness of the shoulders on seal plate 21. Port 44 which extends through outlet flange 40 communicates with bore 45 which extends completely through seal plate 21. The exterior end of port 44 may be tapped to provide a threaded connection with line 43 which is connected to function 42. In general, port 44 is usually of a larger diameter than port 45 to reduce alignment problems. An annular groove is formed on the inner surface outlet flange 40 concentric with and surrounding port 44. An O-ring 24 is located in the annular groove and effects a seal between seal plate 21 and outlet flange 40 concentric to ports 44 and 45.

Piston 25 includes a centrally located and enlarged portion 48 and a pair of arms which extend from opposite sides of the center portion. Bores 51 and 26 are provided in the elongated or enlarged central portion of the piston. These bores extend completely through the central portion 48. Bores 51 and 26 are "off center" relative to the piston as will be noted hereinafter. In addition, bores 49 and 50 are provided in the arms of the piston. Each of bores 49 and 50 extend axially along the arms from the end surfaces 75 and 76 and communicate with an associated one of the seal bores. For example, bore 49 communicates with seal bore 26 while bore 50 communicates with seal bore 51. Thus, as will be seen hereinafter, fluid may flow through the bore 49 or 50 into the respective seal bore 26 or 51 without intercommunicating or interacting with the fluid in the other bore. The arms of the piston are substantially cylindrical and have a substantially circular cross section. The enlarged portion 48 has a substantially cubical configuration with rounded corners to better cooperate with the central bore in body 16. Alternatively, enlarged portion 48 may be viewed as a larger cylindrical member having flattened surfaces. The flattened surfaces of enlarged portion 48 are adapted to move adjacent to but not to abut against the lapped and polished surfaces 47 and 46 of balance plate 20 and seal plate 21 respectively. Since enlarged portion 48 does not touch the polished surfaces, the surface of the piston need not be polished.

Coil springs 52 and 27 are inserted in bores 51 and 26 respectively. A separate seal 29 is inserted in each end of each bore 26 and 51. The seal 29 has a lapped and polished surface on the exterior portion thereof which lapped and polished surface abuts upon the lapped and polished surfaces 46 and 47 of balance plate 20 and seal plate 21, respectively. Seal 29 (see FIG. 4 for detail) includes an O-ring 28 which is inserted in an annular, peripheral groove, to prevent leakage around the seal. Seals 29 are urged outwardly, relative to the bores, by coil springs 52 and 27 whereby the seals are maintained in close abutment to the polished surfaces of balance plate 20 and seal plate 21. Thus, fluid which is supplied to either of the seal bores cannot leak around seals 29 and is confined to the respective bores unless aligned with the outlet port. In addition, since bores 26 and 51 extend completely through enlarged portion 48 of piston 25, a balanced condition is achieved relative to the piston inasmuch as equal pressures are applied on the balance plate and the seal plate.

At either end of the valve is an end cap 17 or 18. End caps 17 and 18 are identical in configuration. The end cap includes a substantially square, exterior configuration of its base member which is compatible with and contiguous with the external configuration of body 16. The interior end of end cap 17 or 18 is a reduced portion which may typically have a cylindrical configuration to be closely fitted with the inner surface of bore 16B in body 16. The interior portion of end caps 17 and 18 are of sufficient length to permit a satisfactory engagement of the end cap with body 16. An annular groove is provided around the periphery of the reduced dimensioned inner end immediately adjacent the larger outer end. O-rings 31 and 36 are inserted in the annular grooves of end caps 17 and 18, respectively.

Each of end caps 17 and 18 have an axial bore therethrough. At the outer end or surface, the bore has a typical dimension for example one-quarter inch or the like and may be threaded to receive an input line such as lines 13 or 14. At the interior end of the end cap, the bore is of a suitable dimension to receive the arms of piston 25. Annular grooves are provided on the inner surface of the bore at the inner end of the end caps and O-rings 30 and 37 are inserted in the annular grooves to provide a seal with the outer surface of the arms of piston 25. The center portion of the bore in the end cap is an underreemed or enlarged portion 33 or 35. While it is not essential that these portions be enlarged cavities, the advantage of providing for lubrication to the arms of piston 25 and avoiding excessive binding on the arms of the piston is provided. End caps 17 and 18 are connected to body 16 by suitable bolts 19. Lock washers may be utilized if desirable.

In operation, the valve is connected between two control units or pods 12 and 15. Each of these pods is connected to an inlet port 34 or 32 via lines 13 or 14, respectively. A function or utilization device 42 is connected via line 43 to output port 44.

In the position shown, it is assumed that pod 15 is operable and exerting control over function 42. Thus, hydraulic fluid or the like exerts pressure from pod 15 via line 14 to the valve. For example, fluid pressure enters port 32, cavity 33, port 50 and seal port 51. The fluid, being incompressible, exerts pressure against the outer surface 75 of one arm of piston 25. In addition, the fluid exerts pressure on the inner wall of seal bore 51 thereby forcing piston 25 to the position shown in FIG. 1. Of course, if pod 15 is operable, pod 12 is understood to be inoperative whereby substantially no pressure is applied to the other end of piston 25.

With the piston in the position shown in FIG. 1, hydraulic fluid flows from pod 15 through line 14, port 32, cavity 33, port 50, seal port 51, to outlet ports 45 and 44, and is supplied via line 43 to function 42. In this manner, pod 15 effects control over function 42.

If now it is assumed that pod 15 becomes inoperative, as for example a leak or malfunction occurs therein, pod 15 will be rendered inoperative by the control unit at the surface location. Simultaneously, pod 12 will be activated to assume control. When pod 12 is activated, fluid will flow through line 13 to port 34. Fluid will abut against and apply pressure to surface 76 of piston 25. Concurrently, fluid will pass through port 49 into seal port 26 and exert pressure on the inner surface thereof. Since port 26 is sealed at either end due to the abutment of seals 29 against sealing surfaces 47 and 46, the fluid cannot escape and continued pressure is supplied against the inner surface of seal bore 26. Since seal bore 26 experiences a relatively large pressure against the inner surface thereof and no pressure is applied to seal bore 51, piston 25 is forced to move, in this case leftwardly, until bore 51 is totally removed from communication with seal plate bore 45 and bore 26 is in communication therewith. When bore 26 is in communication with seal plate bore 45, the pressure is released through bore 45 and outlet port 46 to function 42 thereby to effect a control operation.

It should be noted, that bores 26 and 51 are arranged in the enlarged portion 48 of piston 25 so that seal plate bore 45 communicates with one and only one of the seal bores at any time. That is, the distance between the seal bores is greater than the diameter of seal plate bore 45. Therefore, bore 45 cannot communicate with both seal bores simultaneously. Moreover, seals 29 prevent spurious interaction due to leakage. This eliminates any possible ambiguity which could occur in the valve operation if both seal bores could simultaneously communicate with seal plate bore 45.

In reversing the operation, if pod 12 is rendered inoperative for some reason, and pod 15 is activated, piston 25 will be forced to the position shown in FIG. 1 wherein pod 15 will communicate with function 42 and effect control thereof.

Figure 4:
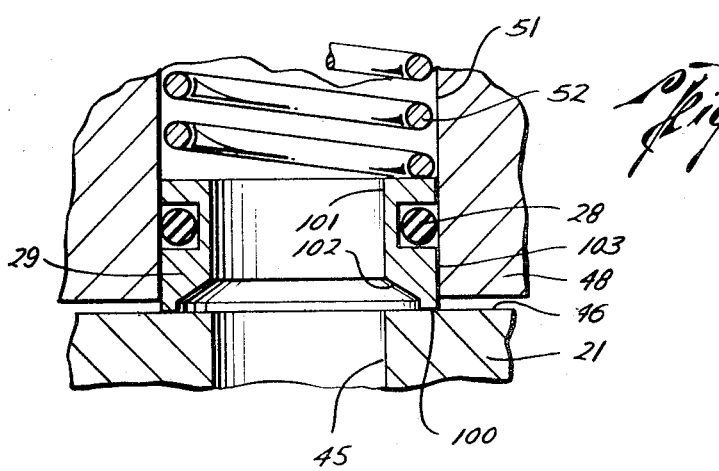
FIG. 4 is a cross-sectional, enlarged view of the fluid seal utilized in the instant valve.

Referring now to FIG. 4, there is a detailed cross-sectional showing of the sealing arrangement relative to the seal bore. In particular, seal bore 51 is shown. Seal 29 is represented at the bottom portion of the seal bore. Coil spring 52 is shown exerting pressure on seal 29 to assure contact between the outer surface of seal 29 and the lapped and polished surface 46 of seal plate 21. O-ring 28 is provided in an annular groove in seal 29 to prevent leakage around seal 29. The central bore 101 of seal 29 is depicted as having a slightly larger diameter than the diameter of outlet port 45. The clearance between enlarged section 48 of piston 25 and the polished surface 46 of seal plate 21 is exaggerated to show same more clearly. However, due to spring 52, seal 29 is forced into abutment with the surface 46 to prevent leakage around enlarged portion 48 of piston 25.

Thus, there has been shown and described a shuttle valve which requires positive pressure to produce positive displacement of the shuttle. The pressure may be provided by a very small amount of fluid applied at a relatively slow rate. The flow rate of the fluid is not essential to effecting positive displacement. The flow rate affects only the response time of the valve. That is, a relatively slow fluid flow rate will require a longer time period to exert sufficient pressure to move the piston in the shuttle valve. However, as in the case of known shuttle valves, the low fluid flow rate will not cause the piston to move to an ambiguous position and then leak around the piston to render the entire system ineffective. This valve is a substantially closed loop or system valve wherein each of separate control systems are totally isolated one from the other and interdependence or interrelationship therebetween cannot be seriously effected.

Having thus described the invention, what is claimed is:

1. A shuttle valve adapted to permit the control of a fluid-pressure-operated utilization device from either one of two separate fluid-pressure-supplying control units comprising:
   a. a body member having a longitudinally extending axial bore therein, and a transversely extending second bore passing through the bottom surface of the body member, intersecting said axial bore, and extending into the outer wall at the top of said body member providing a partial bore therein;
   b. a balance plate positioned in said partial bore and having a polished surface on the side thereof facing the interior of the body member;
   c. a seal plate positioned in the portion of said second bore extending through the bottom portion of said body member, said seal plate having an axial bore extending therethrough from the bottom surface of said seal plate and communicating with the axial bore in said body member, said seal plate having a polished surface in the side thereof facing the interior of the body member;
   d. piston means positioned in said axial bore in the body member and adapted for movement therein between a first end position in which the piston means is positioned in a first furthermost position at one end of said body member and a second end position in which the piston means is positioned in a second furthermost position at the opposite end of the body member, said piston means having a central portion having first and second bores extending transversely completely therethrough from the top to the bottom thereof, said piston means also having first and second arm portions extending longitudinally from said central portion, said first arm portion having an axial bore extending therethrough from the end surface thereof and communicating with said first transversely extending bore in the central portion, said second arm portion having an axial bore extending therethrough from the end surface thereof and communicating with said second transversely extending bore in the central portion, said piston means being positioned so that, in said first end position, said first bore in the central portion thereof is in communication with the bore in said seal plate, and, in said second end position, said second bore in the central portion thereof is in communication with said bore in the seal plate;
   e. seal means positioned at each end of each of said bores extending through the central portion of said piston means, each of said seals having a polished surface on the exterior portion thereof that abuts upon the polished surfaces of said balance plate and said seal plate;
   f. spring means to maintain said seal means in contact with the polished surfaces of said balance plate and said seal plate;
   g. first input conduit means for providing fluid communication between a first control unit and the axial bore in said first arm portion of the piston means;
   h. second input conduit means for providing fluid communication between a second control unit and the axial bore in said second arm portion of the piston means;
   i. output conduit means providing fluid communication between the axial bore in said seal plate and the fluid-pressure-operated utilization device to be controlled, whereby when said first control units is operative, fluid flows through said first input conduit means to the axial bore in the first arm portion of the piston means, the fluid pressure therein being transmitted to said first bore in the central portion of said piston means, the polished surfaces of the balance plate, the seal plate and said sealing means permitting the shuttle valve to slide to its first end position in which said first bore communicates with the bore in the seal plate, thereby establishing fluid communication to the utilization device, whereas when said first control unit is inoperative and said second control unit is operative, the piston means is caused to slide to its second end position so as to establish fluid communication from the second control unit through the axial bore in said second arm portion, said second bore in the central portion and said bore in the sealing plate to the utilization device, the positive fluid pressure required to cause said piston means to slide between the first and second end positions being operative at relatively low flow rates, the flow rate only affecting the response time of the valve in switching from said first to said second end positions.

2. The shuttle valve of claim 1 and including a first end cap secured to one end of said body member, said first end cap having an inlet port providing fluid communication between said first conduit means and the axial bore in said first arm portion of said piston means, said first arm portion extending into a cavity at the inner end of said end cap and including a second end cap secured to the opposite end of said body member, said second end cap having an inlet port providing fluid communication between said second conduit means and the axial bore in said second arm portion of the piston means, said second arm portion extending into a cavity at the inner end of said second end cap, and further including sealing means between said body member and said first and second end caps, and between said first and second end caps and said first and second arm portions of the piston means.

3. The shuttle valve of claim 2 in which said central portion of the piston means is enlarged, the end portions of said central portion contacting the inner surfaces of said end caps at said first and second end positions of said piston means.

4. The shuttle valve of claim 3 and including an outlet flange member secured to the bottom portion of said body member, said outlet flange member covering said seal plate, said flange member having a bore extending therethrough to provide fluid communication between the bore in said seal plate and the output conduit means.

5. The shuttle valve of claim 4 and including sealing means between said outlet flange and said seal plate to prevent the flow of fluid from the bore in said seal plate outside said shuttle valve other than through the bore in said flange member and said outlet conduit means to the utilization device.

* * * * *